March 26, 1946. W. McARTHUR 2,397,322
FOLDING VEHICLE SEAT
Filed Nov. 19, 1943 5 Sheets-Sheet 2
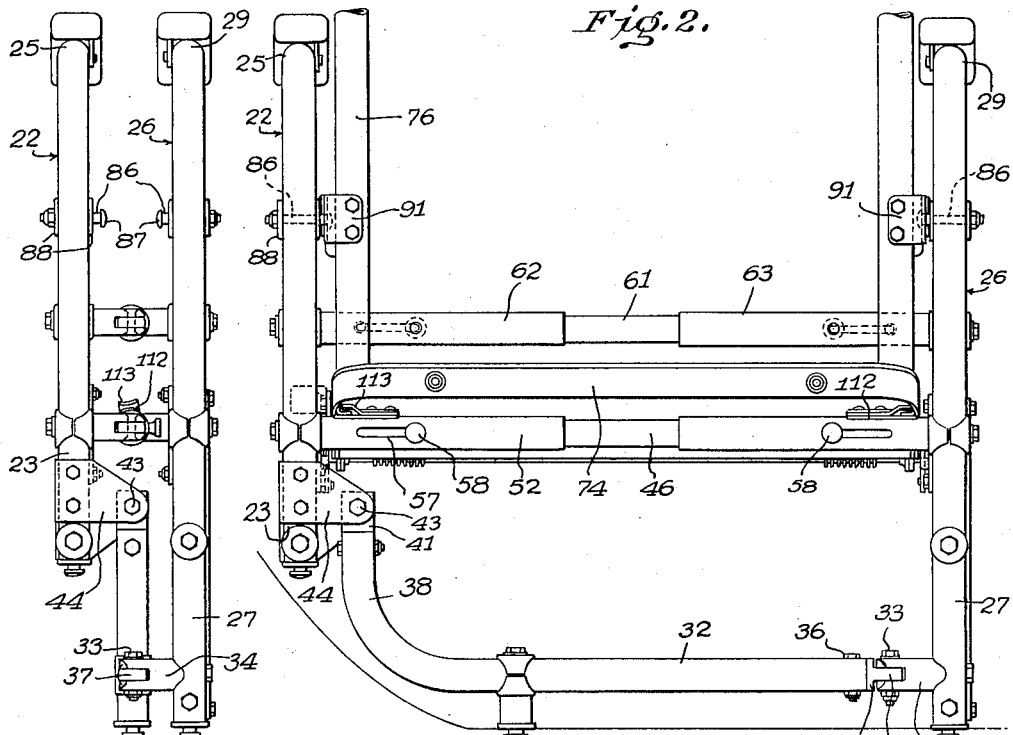
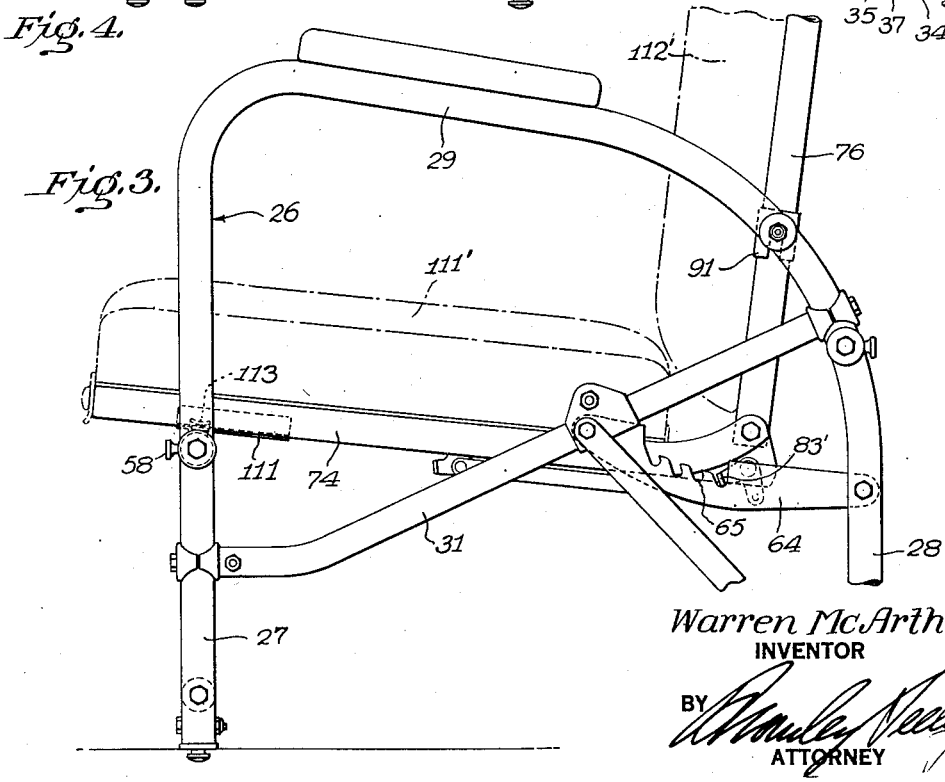
Warren McArthur
INVENTOR March 26, 1946.  W. McARTHUR  2,397,322
FOLDING VEHICLE SEAT
Filed Nov. 19, 1943  5 Sheets-Sheet 3

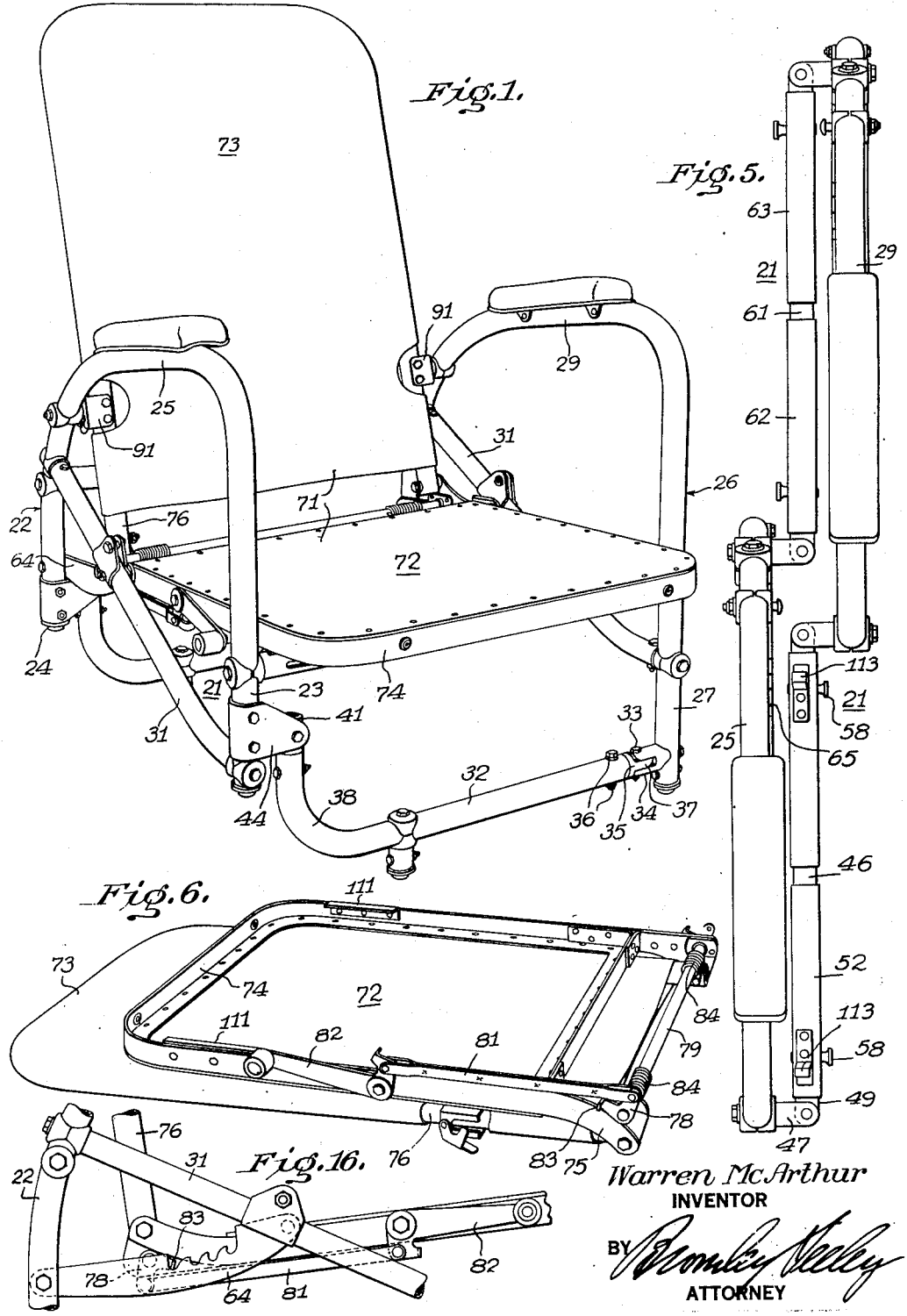

Warren McArthur
INVENTOR
BY
ATTORNEY

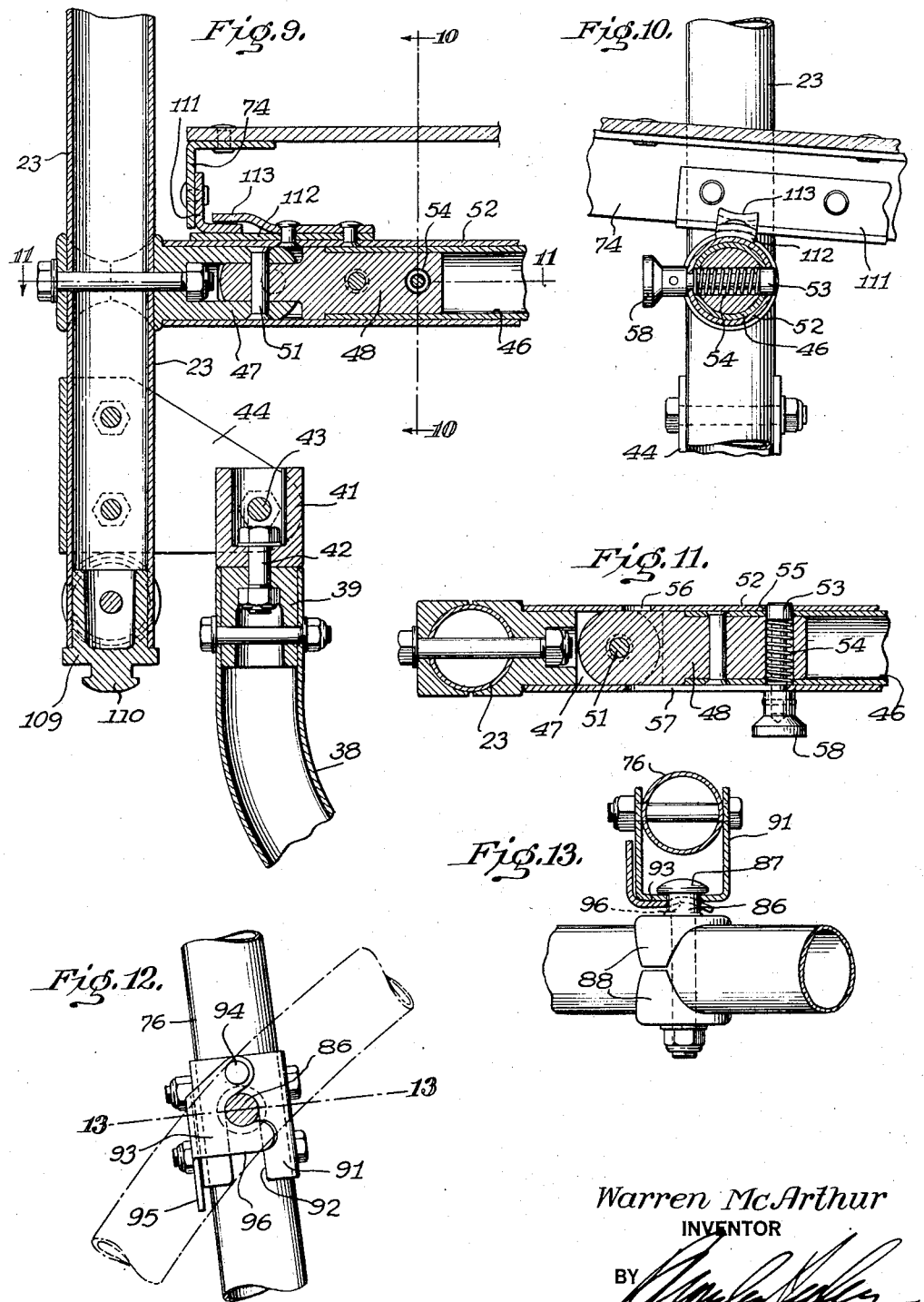

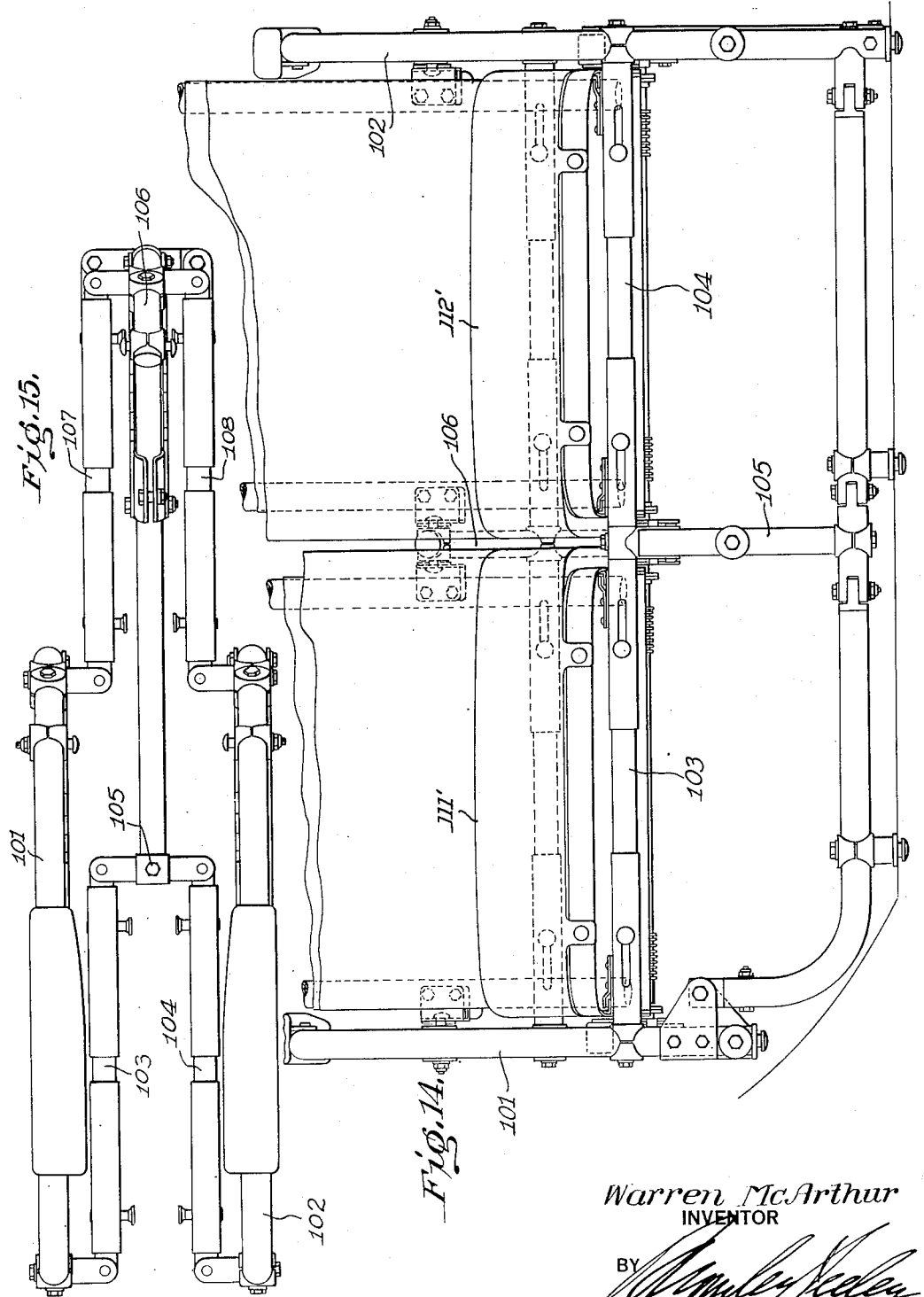

Patented Mar. 26, 1946

2,397,322

UNITED STATES PATENT OFFICE 2,397,322

FOLDING VEHICLE SEAT

Warren McArthur, Bantam, Conn., assignor, by mesne assignments, to Reconstruction Finance Corporation, New York, N. Y., a corporation of the United States Application November 19, 1943, Serial No. 510,882

13 Claims. (Cl. 155—140)

This invention relates to seats and particularly to vehicle passenger seats for use in such vehicles as airplanes, railway coaches, motor buses and the like, although it will be apparent from the following description that various features of the invention are equally well adapted to many other types of seats.

An object of this invention is to provide an improved vehicle seat which can be removed and stowed in a small space when it is desired, for example, to use the vehicle for cargo carrying or for other purposes.

A further object is to provide a folding passenger seat for vehicles constructed and arranged to possess all the features and comfort of conventional seats, such as are now permanently installed in place.

Figure 7:
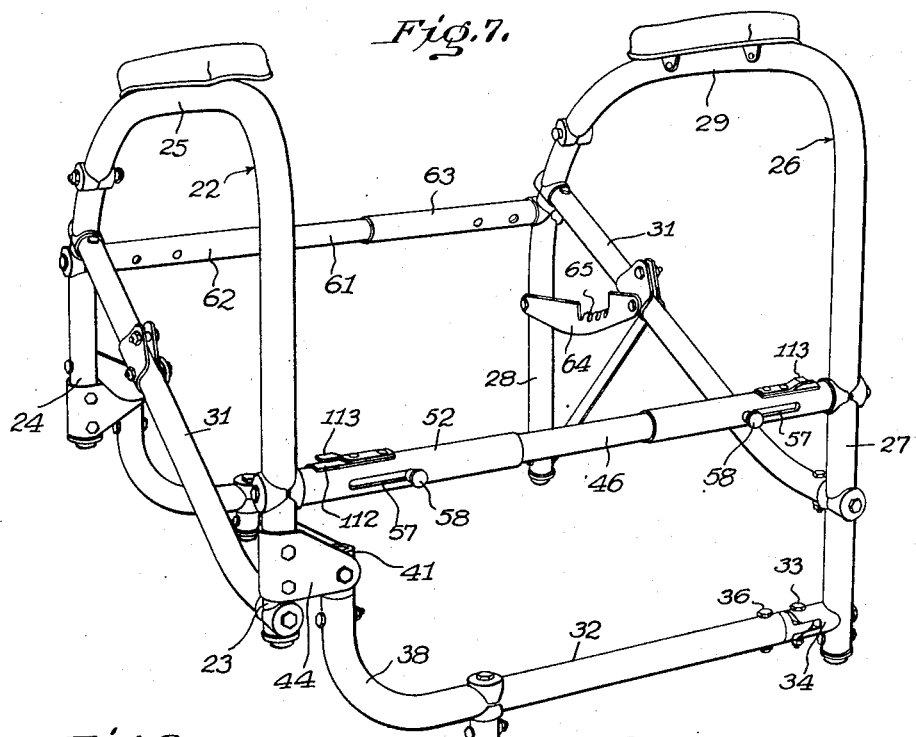
Figure 8:
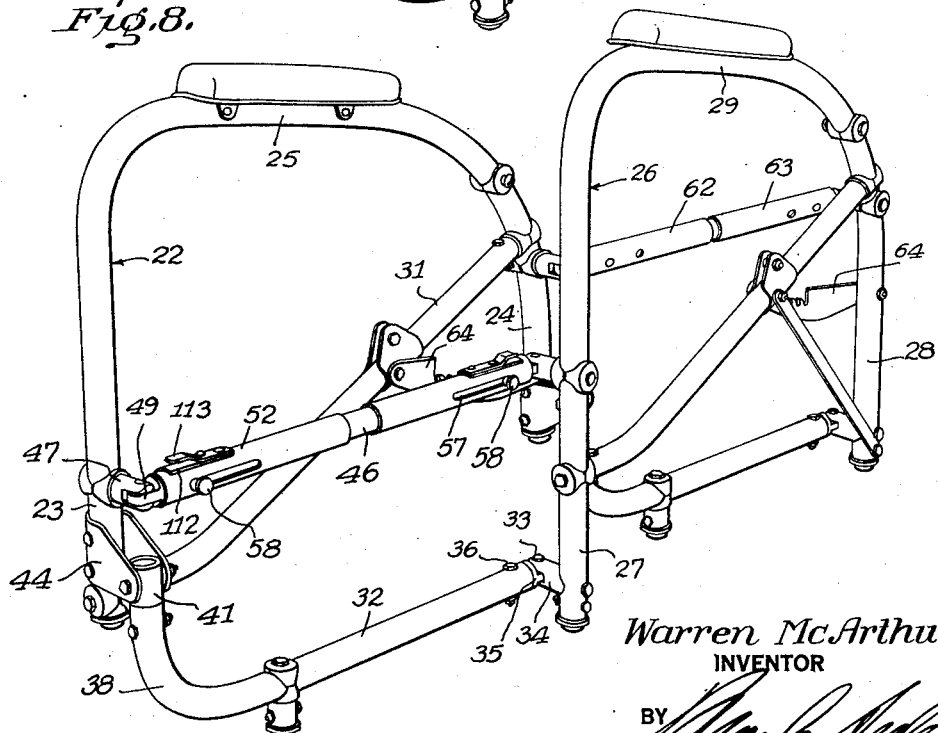

These and other objects which will be apparent are accomplished by the invention hereinafter described and illustrated in the accompanying drawings in which:

Fig. 1 is a perspective view of a passenger seat for vehicles constructed in accordance with one embodiment of this invention, Fig. 2 is a front elevation of a part of the seat shown in Fig. 1, Fig. 3 is a side elevation of the structure shown in Fig. 2, Fig. 4 shows the support frame of Figs. 2 and 3 in folded position, Fig. 5 is a plan thereof, Fig. 6 is a perspective of the seat and back frame in folded position, Fig. 7 is a perspective of the support frame in operating position, Fig. 8 is a perspective of the support frame folded for storage, Fig. 9 is a section showing the connections between a leg and stretcher, and between a leg and leg adaptor, Fig. 10 is a section on the line 10—10 of Fig. 9, Fig. 11 is a section on the line 11—11 of Fig. 9, Fig. 12 is an elevation, partly in section, of the bracket connection between the back frame and the supporting side frames, Fig. 13 is a partial section on the line 13—13 of Fig. 12, Fig. 14 is a front elevation of a double passenger seat showing the invention embodied therein, Fig. 15 is a plan showing the support frame of the double passenger seat in folded position, and Fig. 16 is an elevation of a detail.

In the present invention a support frame is adapted to be folded together without the necessity of removing any of the frame parts, or to be extended into operative position when so folded. A seat and back frame are easily attachable to the support and when supported thereby are adjustable by the occupant in the usual way to various reclining positions. At the same time the seat and back frame can be easily detached from the support frame and folded into a relatively flat small space.

As illustrated, the invention is shown in connection with a vehicle passenger seat and includes a tubular support frame 21 including a side frame member 22, comprising a front leg 23, a rear leg 24, and an arm rest 25 all formed by a single tubular member, and a similar second side frame member 26 comprising a front leg 27, rear leg 28, and arm rest 29. Each side frame is reinforced by a transverse tubular brace 31 connecting the back to the front leg.

The drawings show the legs on the side frame 22 as shorter than those of the side frame 26 which are of conventional length. This arrangement is provided in the seat illustrated which is designed for use in an airplane having a heater duct along the wall adjacent which the frame 22 is located and the short legs 23 and 24 are provided for resting on the top of this duct. Obviously, the legs 23 and 24 can be of conventional length when desired.

On the other hand, the drawings show a leg adaptor for use with the seat illustrated to adapt it for use on flat floors or decks. This adaptor comprises a tubular member 32 hinged at one end to the long leg 27 by a removable bolt 33 permitting separation of the parts. The bolt 33 extends through a bifurcated bracket 34 bolted to the leg 27, the end of the bracket being curved to accommodate the face of the leg. A plug 35 fits within the open end of the tubular adaptor 32 and is secured therein by a cross bolt 36. The plug has a tongue 37 located between and hinged to the bifurcation of the bracket 34 by the removable bolt 33. Adjacent the short leg 23 the adaptor has an upwardly extending curved arm 38 terminating adjacent the short leg and having a combined swivel and hinge connection thereto. As best shown in Figures 8 and 9, this is formed by a plug 39 bolted in the open end of the arm 38 and swiveled to a connector member 41 by a swivel bolt 42. The connector member 41 is hinged by a bolt 43 to a bracket 44 secured to the short leg 23.

It will be understood that a similar adaptor is employed, when adaptors are desired, between the rear legs 24 and 28 of the side frames.

The provision of tubular frame members and the means for connecting them together to form rugged frame members form no part of the present invention, but are more fully described, for example, in my earlier Patent Number 2,035,489, granted March 31, 1936.

The front legs 23 and 27 are connected by a stretcher which includes a tubular frame member 46 hinged at each end to the front legs of the respective side frames 22 and 26. For this purpose a bifurcated hinge bracket or stub shaft 47, similar to the hinge bracket 34, is bolted to each front leg, see Figs. 9 and 11. A hinge plug 48 is secured in the end of the tubular stretcher and has a tongue 49 located between and connected to the bifurcations of the bracket 47 by a hinge pin 51. A sleeve 52 is slidably mounted on the stretcher at each end and is movable into position to lock the adjacent hinge against movement when the support frame is in extended, operative position. It will be obvious that when the sleeve is telescoped over the hinge members they are locked in extended position, as shown in Figs. 2, 7, 9 and 11, and when retracted as shown in Figs. 8, the support frame can be folded. Means are provided for securing the sleeves in either position. As illustrated, this comprises a spring pressed lock pin 53 mounted in an opening 54 and adapted to engage in either of two openings 55 and 56, see Fig. 11, to hold the locking sleeve in either operative or inoperative position. The pin extends through a slot 57 in the opposite side of the sleeve and a head 58 is provided for withdrawing the pin from the sleeve openings when it is desired to shift the sleeve.

As best shown in Figs. 7 and 8, a rear stretcher 61 is provided between the rear legs 24 and 28 of the side frames and sleeves 62 and 63 are provided thereon, the construction and arrangement being similar to that of the front stretcher.

The support frame structure is completed by a lock plate 64, mounted on each side between the adjacent rear leg and the brace 31, and having ratchet teeth 65 in a curved depression in the upper edge.

The seat and back frame 71 comprises a seat section 72 and a back section 73 hinged together for folding into a flat, compact space, as shown in Fig. 6. The seat frame is formed by a substantially U-shaped angle bar 74 having curved ends 75 hinged to the lower ends of the tubular back frame 76 which is formed by a tube bent into substantially inverted U-shape, the seat section and back section being connected together at their ends. As illustrated, each section is provided with a cushion supporting cover of duck, or the like.

The seat section 72 carries the locking mechanism which co-operates with the ratchet plate 64 in locking the seat in adjusted position. This is shown as a lock plate 78, on each side of the frame 73, each lock plate being mounted on the adjacent end of a cross shaft or lock rod 79 rotatably supported in the ends of the frame 74. A lock release rod 81 connects the plate 78 on one side of the frame with an operating hand lever 82 pivoted on the side of the seat section in an easily accessible location. Each lock plate has a tooth or pawl 83 normally pressed into engagement with the ratchet 65 by springs 84 which tension the lock rod 79 in the proper direction for that purpose.

It will be apparent that the pawl and ratchet are automatically engaged merely by locating the seat and back frame in position on the support frame. When in position on the support frame, the seat is slidably supported at the front on the front stretcher 46, and supported at the rear by the back section.

The back section is, in turn, supported on the side frame members of the support frame. For this purpose a back supporting bolt, or pin 86, having a head 87 is mounted in each side frame member, preferably extending through arcuate tube engaging and embracing washers 88 to prevent crushing of the tubular frame member by the clamping pressure of the bolt and nut. Of course, the bolt can be mounted in the frame member by any means and in any way desired.

A bolt engaging back frame-supporting bracket 91 having a vertical slot 92 in the outer wall is securely bolted to the side of the back frame 76, see Figs. 12 and 13. Obviously, all that is required to mount the back frame in place is to lower the brackets 91 into position with the bolts 86 received in the slots 92. In order to prevent unintentional disconnecting of the parts, a catch 93 is mounted on a pivot 94 on the bracket 91, and is provided with a finger grip flange 95 shaped to engage a side wall of the bracket 91 when the catch is moved into position to lock the parts together and prevent removal of the bracket from the supporting bolt 86, as best shown in Fig. 12. The catch 93 is bent inwardly, see Fig. 13, so as to yieldingly engage in the slot 92 when in locking position to yieldingly resist movement out of locking position, the bent tongue being indicated at 96.

It will be apparent that the invention is adapted to various types of passenger seats. In Figs. 14 and 15, for example, it is shown applied to a two passenger seat of the type used in many vehicles. In such a seat the side frame members 101 and 102 are connected by stretchers 103 and 104 to a center front leg 105, and a center rear leg and frame member 106 by rear stretchers 107 and 108. The details of construction are similar to those above described.

As illustrated, each leg is provided with a foot in the form of a plug 109, see Fig. 9, having a head 110, for mounting in a key slot in a floor, or deck plate, not shown, for securing the frame in position and yet permitting easy and quick removal thereof when desired.

It will also be apparent that the present invention provides double use for the space in a vehicle such as a plane, bus or the like. If the space is required for cargo, for example, seats embodying the present invention can be easily removed and folded into compact form. First the latch 96 is withdrawn from the slot 92 and the seat and back frame removed and folded as shown in Fig. 6, after the cushions 111' and 112' have been removed. The support frame is then folded after the stretcher sleeves have been shifted inwardly to free the stretcher hinges and permit folding.

At the point where the seat section 73 rests on the front stretcher, an angle plate 111 is secured to the inner face of the angle bar 74. As shown in Fig. 9, each sleeve 52 has a wear plate 112 on which the frame supporting angle plate rides, and a finger 113, which is moved into position over the angle plate to provide a hold down for the seat section, and prevent its being vertically disengaged from the supporting stretcher.

When folded the seats can be stowed in a small space either at the front or rear of the cargo or on top. Also they can be compactly stored at supply or loading depots, or the like.

It will be apparent that when the adaptor legs are not needed, they can either be entirely removed, or the bolt 36 can be removed and the leg swung around the swivel 42 to a position under the seat and then swung upwardly around the hinge pin 43 where it can be fastened out of sight. Both front and rear adaptors can be so located.

Obviously, the invention can be variously modified and adapted within the scope of the appended claims.

What is claimed is:

1. The combination in a seat of a support frame including a pair of spaced side frame members, a stub shaft carried by and extending laterally of each frame member, a stretcher hinged at its ends to said stub shafts, means for maintaining said stretcher and stub shafts in extended position against folding, including sleeves slidably mounted on said stretcher and movable into and out of position surrounding said stretcher and stub shafts, and means for locking said sleeves in either position.

2. The combination in a seat of a support frame including a pair of spaced side frame members, a stub shaft carried by and extending laterally of each frame member, a stretcher hinged at its ends to said stub shafts, means for maintaining said stretcher and stub shafts in extended position against folding, including sleeves slidably mounted on said stretcher and movable into and out of position surrounding said stretcher and stub shafts, and means for locking said sleeves in either position including a yieldingly mounted pin in said stretcher adapted to engage perforations in said sleeves.

3. The combination in a seat of a seat frame, a support frame for supporting said seat frame, including a pair of spaced side frame members, a stub shaft carried by and extending laterally of each side frame member, a stretcher hinged at its ends to said stub shafts, means including a stretcher sleeve for locking said stretcher and stub shafts in extended position against folding, and means on said stretcher sleeve for engaging said seat frame when in operative position to hold said seat frame in contact with said stretcher.

4. The combination in a seat of a seat frame, a support frame for supporting said seat frame, including a pair of spaced side frame members, a stub shaft carried by and extending laterally of each side frame member, a stretcher hinged at its ends to said stub shafts, means for locking said stretcher and stub shafts in extended position against folding, a wear plate on said stretcher, an angle plate on said seat frame for supporting said seat frame on said wear plate, and a seat holding finger on said stretcher adapted to engage said angle plate when said stretcher is in operative position to hold said seat in contact with said stretcher.

5. The combination in a seat of a support frame including side frame members each including supporting legs, a leg connecting stretcher, a stretcher supporting slotted stub shaft mounted on each leg and extending outwardly therefrom, and means mounted on said stretcher and pivoted in the slots of said shafts for connecting said stretcher to said legs so as to permit said side frame members to be folded together or extended into position for use.

6. The combination in a seat of a support frame including side frame members each including supporting legs, a leg connecting stretcher, a stretcher supporting slotted stub shaft mounted on each leg and extending outwardly therefrom, means mounted on said stretcher and pivoted in the slots of said shafts for connecting said stretcher to said legs so as to permit said side frame members to be folded together or extended into position for use, and a sleeve on said stretcher slidable into telescoping position over said connecting means and stub shaft to lock said frame and stretcher against relative movement.

7. The combination in a seat of a support frame including side frame members each including supporting legs, a leg connecting stretcher, a stretcher supporting slotted stub shaft mounted on each leg and extending outwardly therefrom, means mounted on said stretcher and pivoted in the slots of said shafts for connecting said stretcher to said legs so as to permit said side frame members to be folded together or extended into position for use, a sleeve on said stretcher slidable into telescoping position over one of said connecting means and stub shaft to lock said frame and stretcher against relative movement, and means for locking said sleeve against movement on said stretcher.

8. The combination in a seat of a support frame including side frame members connected by transversely extending stretchers, said frame members having legs of different lengths, an adaptor extending between said legs of different lengths for use in supporting said side frames on a level support, means for hinging said stretchers to said side frame members to permit folding said members together into a relatively flat space, and means for hinging said adaptor to said legs to permit said folding operation.

9. The combination in a seat of a support frame including side frame members connected by transversely extending stretchers, said frame members having legs of different lengths, an adaptor extending between said legs of different lengths for use in supporting said side frames on a level support, means for hinging said stretchers to said side frame members to permit folding said members together into a relatively flat space, and means for hinging said adaptor to said legs to permit said folding operation, said last mentioned means being so constructed and arranged as to permit said adaptor to be disconnected from one of said legs and thereupon swung to an inoperative position.

10. The combination in a seat of a support frame including side frame members connected by transversely extending stretchers, said frame members having legs of different lengths, an adaptor extending between a pair of legs of different lengths for use in supporting said side frames on a level support, means for hinging said stretchers to said side frame members to permit folding said members together into a relatively flat space, means for hinging said adaptor to said legs to permit said folding operation and to permit said adaptor being swung to an inoperative position, including a removable hinge connection to one of said pair of legs, and a combined swivel and hinge connection to the other of said pair of legs, whereby the adaptor can be disconnected from said one of said legs and swung to an inoperative position.

11. The combination in a seat of a support frame including side frame members connected by transversely extending stretchers, said frame members having legs of different lengths, an adaptor extending between said legs of different lengths for use in supporting said side frames on a level support, means for hinging said stretchers to said side frame members to permit folding said members together into a relatively flat space, means for hinging said adaptor to said legs to permit said folding operation and to permit said adaptor being swung upwardly to an inoperative position, including a removable hinge connection to the longer of said legs, and a combined swivel and hinge connection to the shorter of said legs, whereby the adaptor can be disconnected from the longer of said legs and swing into an inoperative position.

12. The combination in a seat of a support frame including side frame members, a removable seat and back frame adapted to be removably supported between said side frame members, means for supporting said seat and back frame on said side frame members including a slotted supporting bracket plate on one of said frames, a plate engaging and supporting pin on the other of said frames, locking means including a locking member pivoted to said plate, and movable to pin-engaging position, and means on said member resiliently engageable with said slot to yieldingly hold said member in pin-retaining position.

13. The combination in a seat of a support frame including side frame members, a removable seat and back frame adapted to be removably supported between said side frame members, means for supporting said seat and back frame on said side frame members including a slotted supporting bracket plate on said seat and back frame, a plate engaging and supporting pin on said side frame member, locking means including a locking member pivoted to said plate, and movable to pin-engaging position, and means on said member resiliently engageable with said slot to yieldingly hold said member in pin retaining position.

WARREN McARTHUR.